US008477334B2

(12) United States Patent
Iwahashi et al.

(10) Patent No.: US 8,477,334 B2
(45) Date of Patent: Jul. 2, 2013

(54) CONTACTLESS IC CHIP, PORTABLE TERMINAL, INFORMATION PROCESSING METHOD, AND PROGRAM

(75) Inventors: Mitsugi Iwahashi, Kanagawa (JP); Tatsuhiko Kanno, Kanagawa (JP); Taro Kurita, Tokyo (JP); Toshiharu Takemura, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 151 days.

(21) Appl. No.: 11/431,008

(22) Filed: May 10, 2006

(65) Prior Publication Data

US 2006/0270397 A1 Nov. 30, 2006

(30) Foreign Application Priority Data

May 25, 2005 (JP) ................................ P2005-151887

(51) Int. Cl.
| | | |
|---|---|---|
| *G06F 3/12* | (2006.01) | |
| *G06K 15/00* | (2006.01) | |
| *H04N 1/00* | (2006.01) | |
| *H04N 1/32* | (2006.01) | |
| *H04N 1/04* | (2006.01) | |

(52) U.S. Cl.
USPC ......... 358/1.15; 358/1.16; 358/403; 358/468; 358/474; 709/220; 709/224

(58) Field of Classification Search
USPC .............. 358/1.15, 1.14, 407, 1.18, 402, 403, 358/440; 709/220
See application file for complete search history.

(56) References Cited

U.S. PATENT DOCUMENTS

| | | | | |
|---|---|---|---|---|
| 6,275,941 | B1 * | 8/2001 | Saito et al. .......................... 726/2 |
| 6,519,050 | B1 * | 2/2003 | Eintracht et al. .............. 358/1.15 |
| 6,819,441 | B2 * | 11/2004 | Umebayashi ................. 358/1.15 |
| 6,978,023 | B2 * | 12/2005 | Dacosta ......................... 380/258 |
| 7,116,440 | B2 * | 10/2006 | Eichhorn et al. ................ 358/1.5 |
| 7,173,722 | B1 * | 2/2007 | Lapstun et al. ............... 358/1.15 |
| 7,188,086 | B2 * | 3/2007 | Shinzaki et al. ................. 705/51 |
| 7,305,457 | B2 * | 12/2007 | Yajima et al. ................. 709/220 |
| 7,467,270 | B2 * | 12/2008 | Higuchi ......................... 711/163 |
| 2002/0194473 | A1 * | 12/2002 | Pope et al. ..................... 713/168 |
| 2003/0214670 | A1 * | 11/2003 | Ohmura ....................... 358/1.15 |

(Continued)

FOREIGN PATENT DOCUMENTS

| | | |
|---|---|---|
| JP | 01-106245 A | 4/1989 |
| JP | 04-280317 A | 10/1992 |

(Continued)

OTHER PUBLICATIONS

Japanese Office Action issued May 25, 2010 for corresponding Japanese Application No. 2005-151887.

*Primary Examiner* — Akwasi M Sarpong
(74) *Attorney, Agent, or Firm* — Rader, Fishman & Grauer PLLC (57) ABSTRACT

A semiconductor integrated circuit device for use in a data communication apparatus includes setting means for setting, for each of a plurality of files that the semiconductor integrated circuit device manages, a flag indicating whether definition information functioning as information on each of the plurality of files is browsable or not browsable; and response sending means for sending, when provision of the definition information on a file is externally requested, a response falsely indicating that the semiconductor integrated circuit device is not managing the file existing in the plurality of files according to the flag set for the file indicating that the definition information on the file is not browsable.

11 Claims, 8 Drawing Sheets

U.S. PATENT DOCUMENTS

| | | | |
|---|---|---|---|
| 2004/0006606 A1* | 1/2004 | Marotta et al. | 709/219 |
| 2004/0156073 A1* | 8/2004 | Sato et al. | 358/1.15 |
| 2004/0169883 A1* | 9/2004 | Eichhorn et al. | 358/1.15 |
| 2004/0233475 A1* | 11/2004 | Mikuni et al. | 358/1.15 |
| 2004/0263901 A1* | 12/2004 | Critelli et al. | 358/1.15 |
| 2005/0002057 A1* | 1/2005 | Oe | 358/1.15 |
| 2005/0132054 A1* | 6/2005 | Chang et al. | 709/227 |
| 2005/0134896 A1* | 6/2005 | Koga | 358/1.14 |
| 2005/0134906 A1* | 6/2005 | Takashima | 358/1.15 |
| 2005/0146744 A1* | 7/2005 | McAllister et al. | 358/1.15 |
| 2005/0243362 A1* | 11/2005 | Sakuda et al. | 358/1.15 |
| 2005/0275874 A1* | 12/2005 | Rothwell | 358/1.15 |
| 2006/0018506 A1* | 1/2006 | Rodriguez et al. | 382/100 |
| 2006/0061806 A1* | 3/2006 | King et al. | 358/1.15 |
| 2006/0161588 A1* | 7/2006 | Nomoto | 707/104.1 |
| 2006/0227367 A1* | 10/2006 | Kitada | 358/1.15 |
| 2007/0060152 A1* | 3/2007 | Sakamoto | 455/450 |

FOREIGN PATENT DOCUMENTS

| | | | |
|---|---|---|---|
| JP | 07-036768 A | | 2/1995 |
| JP | 2002-351728 | * | 12/2002 |
| JP | 2002-351728 A | | 12/2002 |
| JP | 2003-006578 | | 1/2003 |
| JP | 2003-131919 A | | 5/2003 |
| JP | 2006-164019 A | | 6/2006 |
| JP | 2006-277122 A | | 10/2006 |

* cited by examiner

| DEFINITION INFORMATION |
|---|
| • NODE CODE INFORMATION/KEY VERSION |
| • AllocateBlock INFORMATION |
| PRIVACY ATTRIBUTE FLAG |
| • BROWSE PERMISSION FLAG (BROWSABLE/NON-BROWSABLE) |
| • EXTERNAL I/F DESIGNATION FLAG (EXTERNAL I/F NUMBER) |

CONTACTLESS IC CHIP, PORTABLE TERMINAL, INFORMATION PROCESSING METHOD, AND PROGRAM

CROSS REFERENCES TO RELATED APPLICATIONS

The present invention contains subject matter related to Japanese Patent Application JP 2005-151887 filed in the Japanese Patent Office on May 25, 2005, the entire contents of which are incorporated herein by reference.

BACKGROUND OF THE INVENTION

1. Field of the Invention

The present invention relates to contactless IC chips, portable terminals, information processing methods, and programs, and more particularly, to a contactless IC chip, a potable terminal, an information processing method, and a program capable of hiding information within the contactless IC chip.

2. Description of the Related Art

In recent years, taking advantage of being installed in cellular phones, contactless IC chips, such as FeliCa®, are becoming more familiar. For example, a user of a cellular phone containing a contactless IC chip is able to pay for goods using the cellular phone or to check information on a train pass by bringing the cellular phone closer to a reader/writer installed on an automatic ticket gate.

Figure 1:
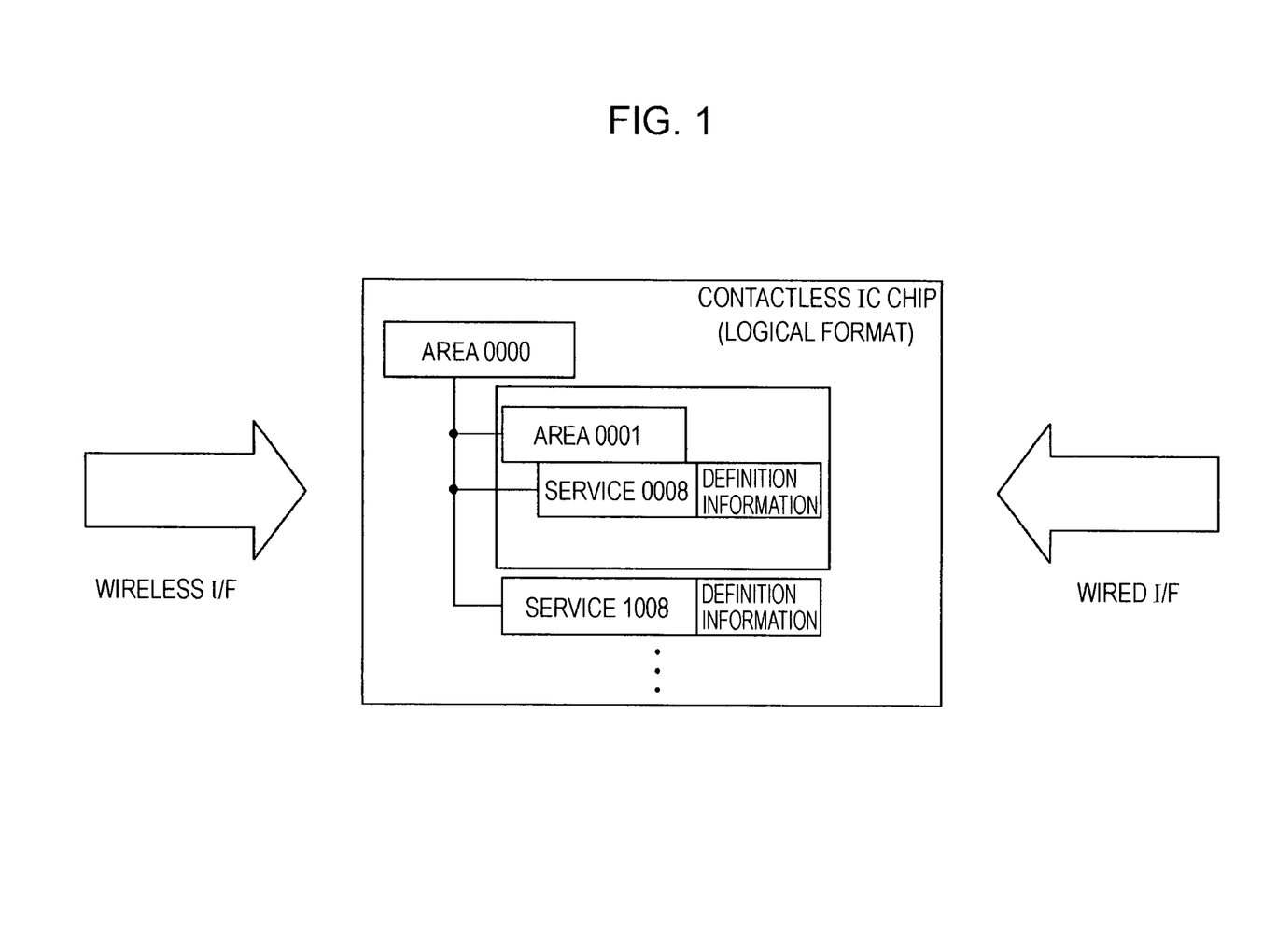
FIG. 1 illustrates an example of the logical format of data within a contactless IC chip.

FIG. 1 shows an example of the logical format of data within a contactless IC chip.

In this specification, the term "contactless IC chip" means a semiconductor integrated circuit device that at least implements an IC card function and that includes a wireless interface. The term "contactless IC chip" represents an IC chip installed in data communication devices, such as IC cards, cellular phones, and personal digital assistants (PDAs).

In the example shown in FIG. 1, "area 0001", "service 0008", and "service 1008" are registered for "area 0000", which functions as a parent layer.

The term "area" means a region for managing a service, which will be described later. For example, the term "area" used here is similar to the term "folder" used in Windows®. One or more areas are generated based on a command transmitted from a reader/writer, and services are hierarchically managed in the respective areas. In order to access a service managed in an area functioning as a parent layer, a key identical to that assigned when generating the area must be provided to an accessing apparatus (for example, a reader/writer), according to need.

The term "service" means a region for managing an entity of data, such as data itself of electronic money. For example, the term "service" used here is similar to the term "file" used in Windows. One or more services are appropriately generated, in an area functioning as a parent layer, based on a command transmitted from a reader/writer. In order to access data managed in a service, a key identical to that assigned when generating the service must be provided to an accessing apparatus (for example, a reader/writer), according to need.

In the example shown in FIG. 1, definition information is added to each of the "service 0008" and the "service 1008".

Definition information includes information on a service, such as node code information (that is, a service number), a key version, and AllocateBlock information (that is, the number of blocks of definition information allocated to a file system), as described later.

When an external wireless interface (I/F) causes a contactless IC chip that manages data on the basis of such a logical format to execute a "Request Service" command, file information, such as the above-mentioned definition information including a service number, a key version, and the like (a key is not required for access to the definition information), on the "area 0000", the "area 0001", the "service 0008", and the "service 1008" can be acquired, as shown in FIG. 1. Similarly, when an internal wired I/F causes the contactless IC chip to execute a "Request Service" command, file information on the "area 0000", the "area 0001", the "service 0008", and the "service 1008" can be acquired.

Interfaces of a contactless IC chip are channels between a transmitter of a command to be executed by the contactless IC chip and a configuration (command execution unit) that executes the command within the contactless IC chip. As shown in FIG. 1, a wireless I/F and a wired I/F are available as interfaces of the contactless IC chip.

When a command is transmitted from a reader/writer, a wireless I/F (or the external I/F) corresponds to a channel between the reader/writer and the command execution unit, that is, electromagnetic waves, a configuration of the contactless IC chip that receives the electromagnetic waves, and a physical and logical configuration that acquires data by demodulating the received electromagnetic waves and that outputs an acquired command to the command execution unit.

In addition, a contactless IC chip contained in a portable terminal is capable of executing commands generated by an application (that is, a program described based on Java® or the like) running on the portable terminal, as well as commands generated by and transmitted from a reader/writer. In this case, a wired I/F (or internal I/F) corresponds to a physical and logical configuration between the application (that is, a central processing unit (CPU) executing the application) and a command execution unit of the contactless IC chip.

Definition information and the like, from among information registered in a contactless IC chip, can be easily acquired by a third party.

A method for managing entering and leaving of a user using a contactless IC card in which a personal ID and the like are registered is disclosed in Japanese Unexamined Patent Application Publication No. 2003-6578.

SUMMARY OF THE INVENTION

As shown in FIG. 1, when executing a "Request Service" command, the contactless IC chip unconditionally sends a response indicating registered definition information to an external reader/writer. This is undesirable for users of contactless IC chips who do not want all the information registered in a file system open to the public.

In other words, since information on a node code or the like indicates for what service (for example, an electronic money service or a management service for a train pass) the user uses the contactless IC-chip, allowing a third party to acquire such information without restriction is of a problem in terms of privacy protection.

Thus, it is desirable to hide information within a contactless IC chip.

A contactless IC chip includes a setting means/step for setting, for each of a plurality of managed files, a flag indicating whether definition information functioning as information on each of the plurality of files is browsable or not browsable; and a response sending means/step for sending, when provision of the definition information on a file is externally requested, a response falsely indicating that the file existing in the plurality of files is not being managed according to the flag set for the file indicating that the definition information on the file is not browsable.

The setting means may also set a flag designating a requester who requests provision of the definition information. When the provision of the definition information is requested from the requester designated by the flag set by the setting means, the response sending means may send the response falsely indicating that the file is not being managed.

Accordingly, information within a contactless IC chip can be hidden.

DESCRIPTION OF THE PREFERRED EMBODIMENTS

Before describing preferred embodiments of the present invention, the correspondence between an aspect of the present invention and an embodiment will be discussed below. This description is intended to assure that embodiments supporting the claimed invention are described in this specification. Thus, even if an embodiment described in this specification is not described here as relating to an aspect of the present invention, this does not mean that the embodiment does not relate to that aspect of the present invention. In contrast, even if an embodiment is described here as relating to an aspect of the present invention, this does not mean that the embodiment does not relate to other aspects of the present invention.

Furthermore, this description should not be construed as restricting that all the aspects of the present invention described in this specification are described. In other words, this description does not preclude the existence of aspects of the present invention that are described in this specification but that are not claimed in this application, in other words, does not preclude the existence of aspects of the present invention claimed by a divisional application or added by amendment in the future.

A semiconductor integrated circuit device for use in a data communication apparatus (for example, a contactless IC chip 2 shown in FIG. 6) according to an embodiment of the present invention includes setting means (for example, a flag manager 52 shown in FIG. 7) for setting, for each of a plurality of files that the semiconductor integrated circuit device manages, a flag (for example, a browse permission flag shown in FIG. 5) indicating whether definition information (for example, a node code and a key version) functioning as information on each of the plurality of files is browsable or not browsable; and response sending means (for example, a response section 53 shown in FIG. 7) for sending, when provision of the definition information on a file is externally (for example, from a CPU contained in a cellular phone 1 or an external reader/writer) requested (for example, when a "Request Service" command is transmitted), a response falsely indicating that the semiconductor integrated circuit device is not managing the file existing in the plurality of files according to the flag set for the file indicating that the definition information on the file is not browsable.

The setting means may also set a flag (for example, an external I/F designation flag shown in FIG. 5) designating a requester who requests provision of the definition information. When the provision of the definition information is requested from the requester designated by the flag set by the setting means, the response sending means may send the response falsely indicating that the semiconductor integrated circuit device is not managing the file.

An information processing method according to an embodiment of the present invention includes the steps of setting (for example, step S1 shown in FIG. 8), for each of a plurality of managed files, a flag (for example, the browse permission flag shown in FIG. 5) indicating whether definition information (for example, a node code and a key version) functioning as information on each of the plurality of files is browsable or not browsable; and sending (for example, step S17 in FIG. 9), when provision of the definition information on a file is externally (for example, from the CPU contained in the cellular phone 1 or the external reader/writer) requested (for example, the "Request Service" command is transmitted), a response falsely indicating that the file existing in the plurality of files is not being managed according to the flag set for the file indicating that the definition information on the file is not browsable.

Steps of a program according to an embodiment of the present invention are similar to those in the above-mentioned information processing method.

Embodiments of the present invention will be described with reference to the drawings.

Figure 2:
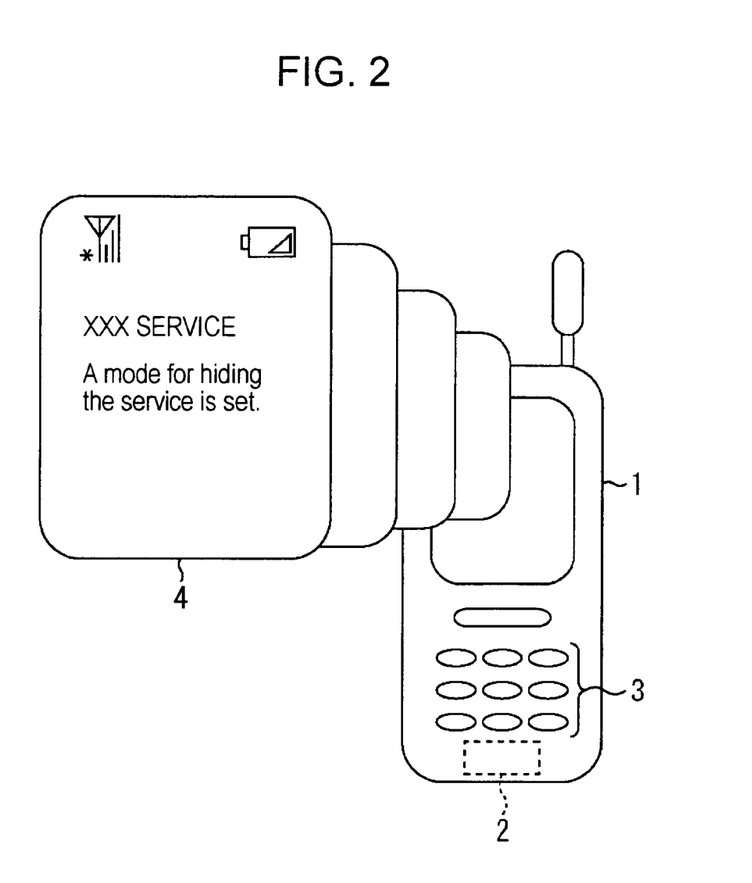
FIG. 2 is an illustration for explaining a concept of a privacy function (information hiding function) in a cellular phone according to an embodiment of the present invention.
Figure 3:
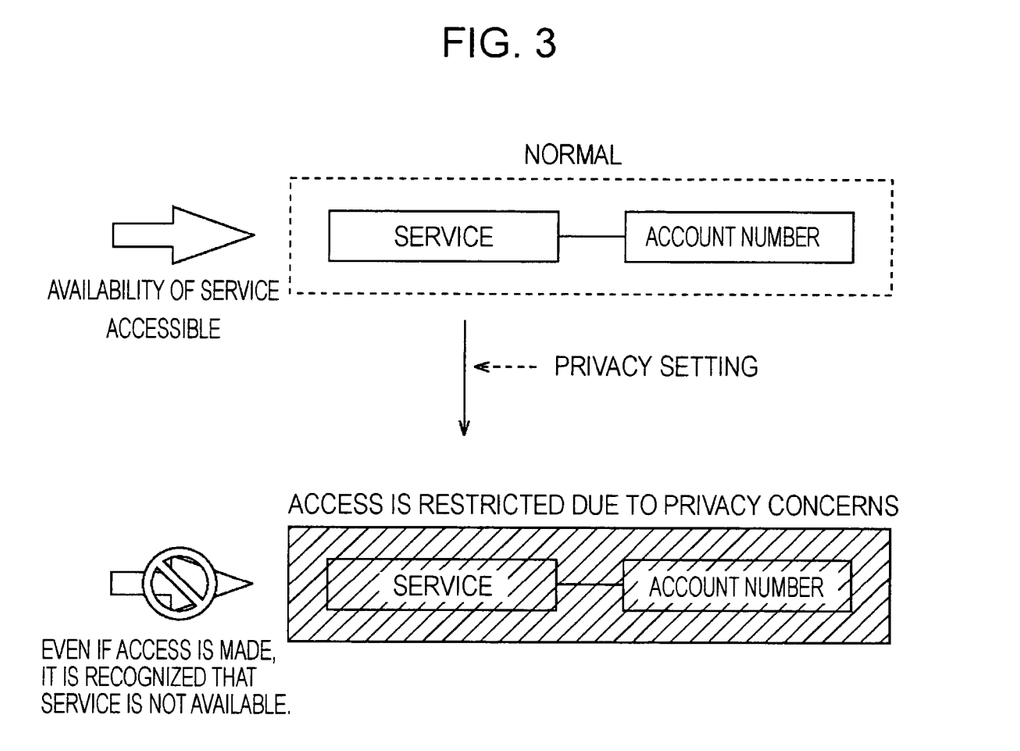
FIG. 3 is an illustration for explaining the concept of the privacy function (information hiding function) in the cellular phone according to the embodiment of the present invention.

FIGS. 2 and 3 illustrate the concept of a privacy function (information hiding function) of a cellular phone 1 according to an embodiment of the present invention.

As shown in FIG. 2, the cellular phone 1 contains a contactless IC chip 2. When executing a command supplied from the cellular phone 1 (that is, an application executed by a CPU), the contactless IC chip 2 supplies information on a predetermined area and service stored in a nonvolatile memory to the application. In addition, when detecting that the cellular phone 1 is brought closer to an external reader/writer (not shown), the contactless IC chip 2 reads and transmits various types of stored information in accordance with electromagnetic waves radiated from the reader/writer.

A user of the cellular phone 1 is able to set a privacy attribute flag for information stored in the contactless IC chip 2 by operating an input unit 3 while viewing a setting screen on a display unit 4 displayed when the application implementing the privacy function is being executed.

The privacy attribute flag is information indicating whether information on an area and a service for which the privacy attribute flag is set is accessible or not. For example, as shown in FIG. 3, when a third party accesses a contactless IC chip to query whether or not a service is available, if a privacy attribute flag is not set (that is, if access is permitted), information on the service managing a bank account number (that is, a service number, a key version, and the like) can be read.

If a user sets such a privacy attribute flag for the service (that is, if access is not permitted), as shown by the tip of the solid-line arrow in FIG. 3, access to the service managing a back account number is restricted. The accessing third party recognizes that the service does not exist in the contactless IC chip 2.

When such a privacy attribute flag is set for "XXX service", for example, a message "XXX Service. A mode for hiding the service is set." is indicated on the display unit 4 of the cellular phone 1, as shown in FIG. 2.

Thus, if the user of the cellular phone 1 sets the privacy attribute flag for a service that the user does not want to release to the public, a third party is not able to view information on the service, that is, information can be hidden.

Figure 4:
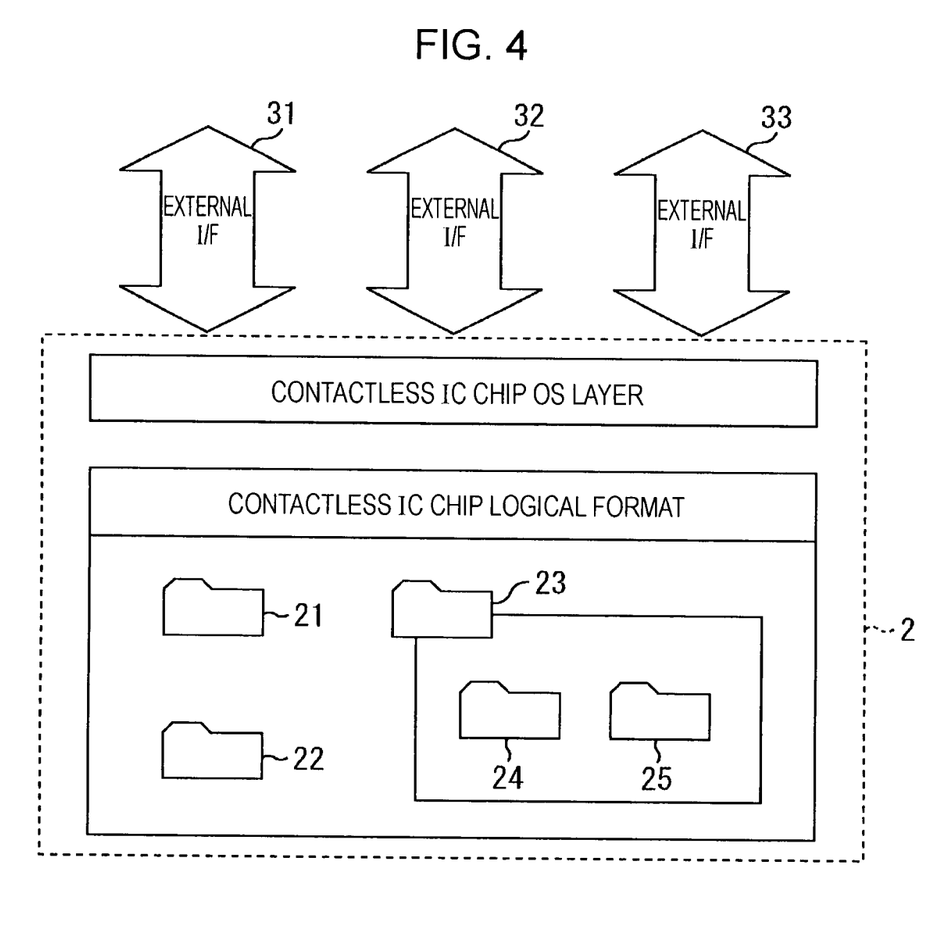
FIG. 4 illustrates an example of information hiding by the contactless IC chip.

FIG. 4 illustrates an example of information hiding by the contactless IC chip 2.

In the example shown in FIG. 4, as a contactless IC chip logical format, areas 21 to 23 are registered, and services 24 and 25 are registered for the area 23. In addition, in the example shown in FIG. 4, external interfaces (I/Fs) 31 to 33 are provided. The user of the cellular phone 1 is able not only to set whether access is permitted or not for each area and each service but also to set whether access is permitted or not for each external I/F.

Figure 5:
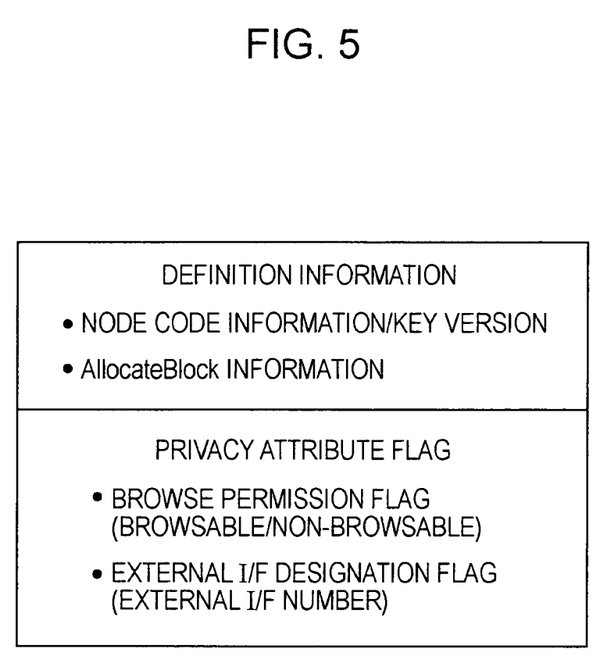
FIG. 5 illustrates an example of definition information and a privacy attribute flag.

FIG. 5 illustrates an example of definition information and a privacy attribute flag to be added to each area and each service.

Definition information includes information on an area and a service, such as "node code information" (that is, a service code) indicating identification information of the service, a "key version" indicating the version of a key set for the area and the service to which the definition information is added, and "AllocateBlock information" indicating the number of blocks allocated to the definition information (that is, the number of memory areas formed by predetermined units).

A privacy attribute flag includes a "browse permission flag" indicating whether or not a service can be browsed (that is, whether or not access is permitted) and an "external I/F designation flag" (that is, an external I/F number) designating an external I/F whose access is restricted.

Referring back to FIG. 4, for example, the user sets the privacy attribute flag in order to hide the area 21 from the external I/F 31 (that is, in the privacy attribute flag to be added to the area 21, the browse permission flag is set to be non-browsable and the external I/F designation flag is set to the number of the external I/F 31). In this case, although the external I/Fs 32 and 33 are capable of accessing the area 21, the external I/F 31 is not capable of accessing the area 21.

With the privacy attribute flag including such information, the user is able to put restrictions on access from each I/F to an area and a service. Processing performed by the contactless IC chip 2 in accordance with settings of a privacy attribute flag will be described later with reference to flowcharts.

Figure 6:
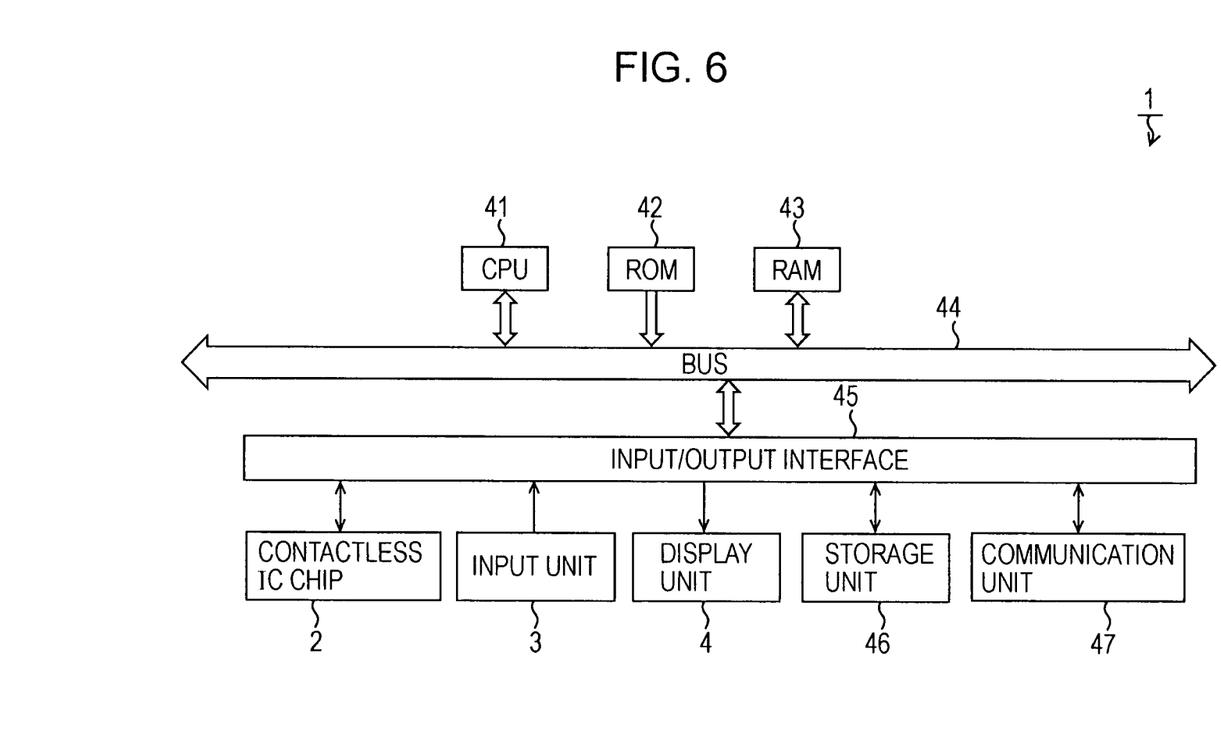
FIG. 6 is a block diagram showing an example of the configuration of the cellular phone.

FIG. 6 is a block diagram showing an example of the configuration of the cellular phone 1.

A CPU 41, a read-only memory (ROM) 42, and a random-access memory (RAM) 43 are connected to each other via a bus 44. An input/output interface 45 is connected to the bus 44. The contactless IC chip 2, the input unit 3, the display unit 4, a storage unit 46, and a communication unit 47 that performs communication processing via a network, such as the Internet, are connected to the input/output interface 45.

The CPU 41 performs various types of processing in accordance with a program stored in the ROM 42 or a program loaded from the storage unit 46 to the RAM 43. Basically, fixed data of various programs and parameters for arithmetic operations used by the CPU 41 is stored in the ROM 42. Data necessary for the CPU 41 to perform various types of processing is appropriately stored in the RAM 43.

The input unit 3 includes buttons, switches, jog-dials, or the like. The input unit 3 inputs to the CPU 41 various instructions based on user operations. The display unit 4 includes a display, such as a liquid crystal display (LCD). Various types of information are displayed as text and images on the display unit 4. The storage unit 46 includes a nonvolatile memory or the like. Various programs and data executed by the CPU 41 are stored in the storage unit 46.

The contactless IC chip 2 includes a controller, such as a CPU, an antenna, and a memory. The contactless IC chip 2 reads data stored in the memory or writes data into the memory in accordance with a change of an antenna load.

Figure 7:
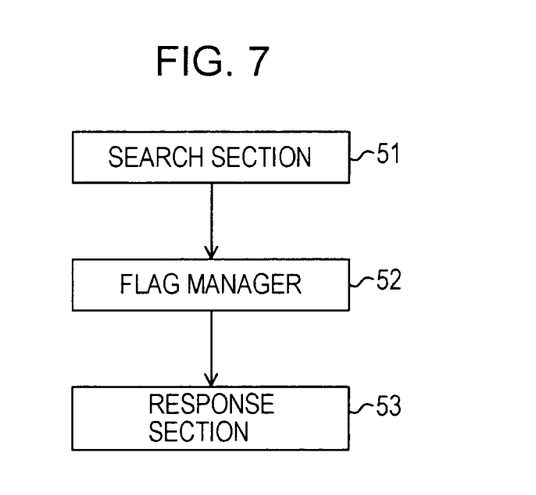
FIG. 7 is a block diagram showing an example of the functional configuration of the contactless IC chip.

FIG. 7 is a block diagram showing an example of the functional configuration of the contactless IC chip 2. At least part of the functional blocks shown in FIG. 7 is implemented when the CPU of the contactless IC chip 2 executes a predetermined program.

A search section 51 executes a "Request Service" command supplied via an external I/F or the like, and searches for areas and services (in the example shown in FIG. 4, the areas 21 to 23 and the services 24 and 25) registered in the contactless IC chip 2. The search section 51 supplies a search result to a flag manager 52.

The flag manager 52 sets a browse permission flag and an external I/F designation flag of a privacy attribute flag, for example, in accordance with an instruction from an application implementing a privacy function (that is, an application executed by the CPU 41 of the cellular phone 1), and manages the set flags. When the user sets the flags, information indicating the settings is supplied from the application executed by the CPU 41.

In addition, the flag manager 52 determines a privacy attribute flag for an area and a service supplied as a search result from the search section 51. The flag manager 52 supplies a determination result to a response section 53.

The response section 53 sends, using a "Request Response" command, to a transmitter of a "Request Service" command a response corresponding to a determination result supplied from the flag manager 52. The response section 53 reports to the transmitter of the "Request Service" command whether or not an area and a service exists.

Figure 8:
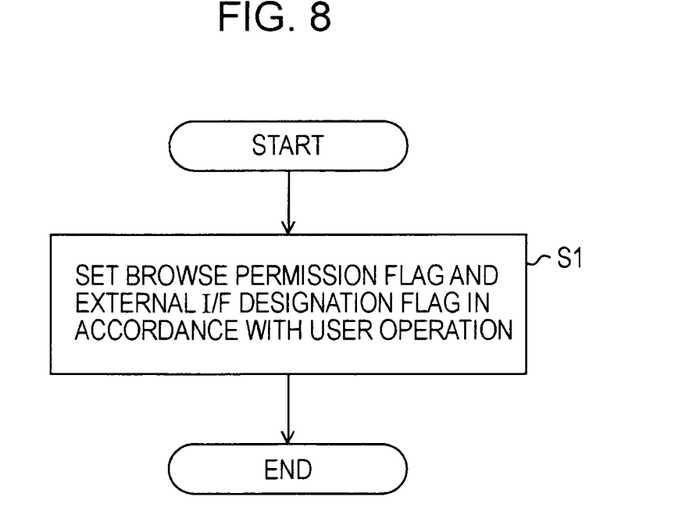
FIG. 8 is a flowchart of a flag setting process.

A flag setting process performed by the contactless IC chip 2 is described next with reference to the flowchart shown in FIG. 8.

In step S1, the flag manager 52 sets a browse permission flag and an external I/F designation flag of a privacy attribute flag in accordance with an instruction from an application that implements a privacy function. For example, the instruction from the application that implements the privacy function includes information indicating an instruction to set the browse permission flag of the privacy attribute flag to be browsable or non-browsable and information indicating an instruction to set the number of an external I/F for the external I/F designation flag.

Figure 9:
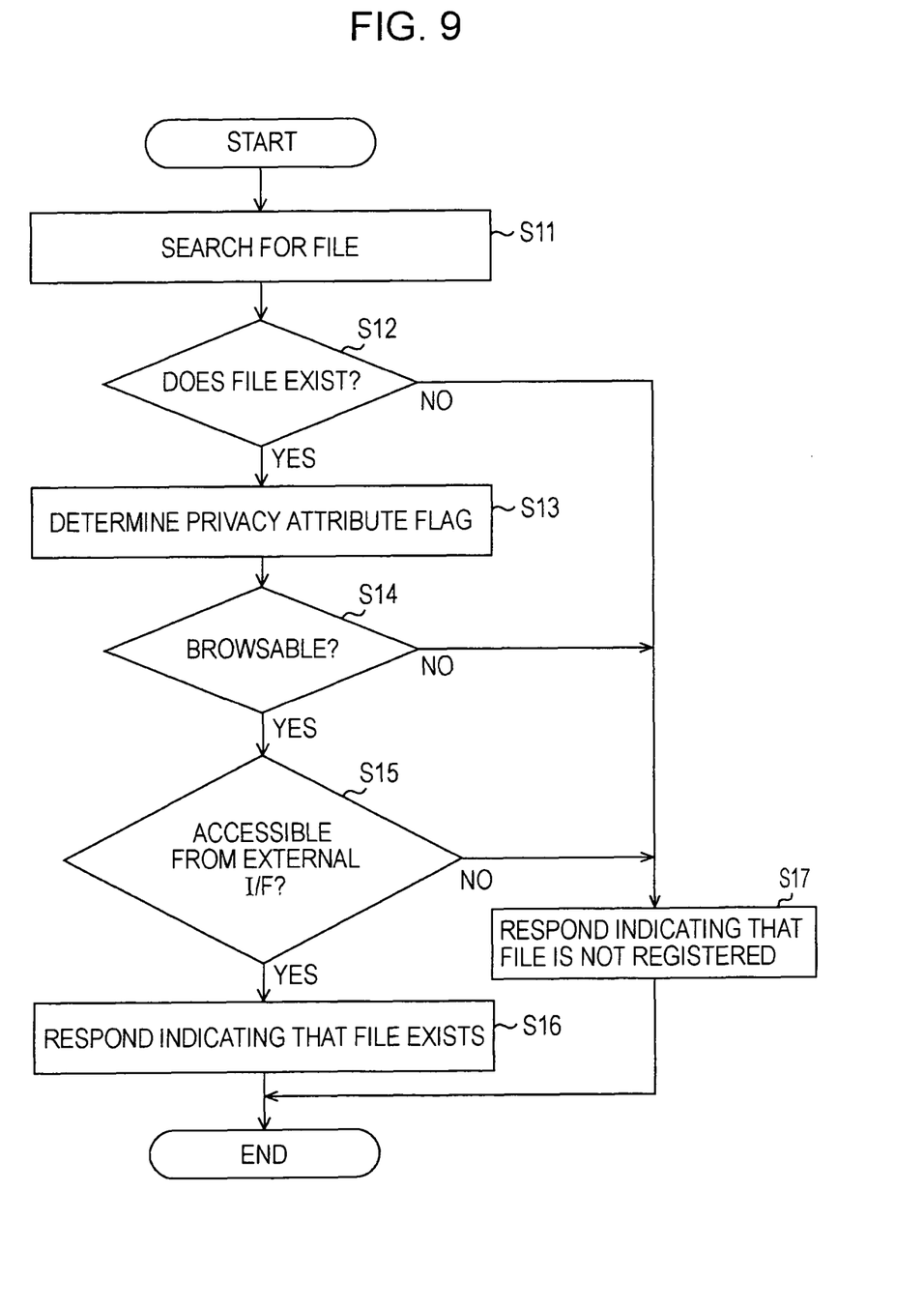
FIG. 9 is a flowchart of a response process.

A response process performed by the contactless IC chip 2 is described next with reference to the flowchart shown in FIG. 9. This process is performed, for example, when a "Request Service" command indicating an instruction to search for a predetermined file (an area and a service) is transmitted from an external reader/writer.

In step S11, the search section 51 executes a "Request Service" command transmitted via an external I/F, and searches for a file registered in the contactless IC chip 2. The search section 51 outputs a search result to the flag manager 52.

In step S12, the flag manager 52 determines whether or not the file exists in the contactless IC chip 2 in accordance with the search result of the search section 51. If it is determined in step S12 that the file exists, the process proceeds to step S13.

In step S13, the flag manager 52 determines a privacy attribute flag of the found file. For example, the flag manager 52 determines whether or not the browse permission flag of the privacy attribute flag added to the found file is set to be browsable and whether or not the number of an external I/F is set for the external I/F designation flag.

In step S14, the flag manager 52 determines whether or not the found file is browsable, that is, whether or not the browse permission flag of the privacy attribute flag is set to be browsable, in accordance with the determination result of the processing in step S13. If it is determined in step S14 that the browse permission flag is set to be browsable, the process proceeds to step S15.

In step S15, the flag manager 52 determines whether an external I/F (a currently accessing external I/F) is capable of accessing the found file, that is, whether the number of the accessing external I/F is not set for the external I/F designation flag of the privacy attribute flag.

If the flag manager 52 determines in step S15 that the external I/F is capable of accessing the found file, the process proceeds to step S16.

In step S16, the response section 53 sends to the external I/F a "Request Response" command indicating that the file exists. For example, if a privacy attribute flag added to the area 21 shown in FIG. 4 is set such that browsing is permitted and that access from the external IF is permitted, the response section 53 sends a "Request Response" command indicating that the file (the area 21) exists.

If the flag manager 52 determines in step S12 that the file does not exist in the contactless IC chip 2, if the flag manager 52 determines in step S14 that the found file is not browsable (that is, the browse permission flag is set to be non-browsable), or if the flag manager 52 determines in step S15 that the external I/F is not capable of accessing the found file (that is, the number of the external I/F is set for the external I/F flag), the process proceeds to step S17.

In step S17, the response section 53 sends to the external I/F a "Request Response" command indicating that the file is not registered (does not exist). For example, if the privacy attribute flag added to the service 24 shown in FIG. 4 is set such that browsing is not permitted and that access from the external I/F is not permitted, the response section 53 sends a "Request Response" command falsely indicating that the file, which actually exists, does not exist.

As described above, when a user does not want information registered in a file system open to the public, if access restriction is set in a privacy attribute flag to be added to a file, a function to hide information on the file for which access is restricted can be implemented. With such a function, when a third party accesses a file for which access is restricted, the file acts as if the file did not exist even though the file exists in the file system. Thus, user's privacy can be protected.

The foregoing series of processing may be performed by hardware or software.

If the foregoing series of processing is performed by software, a program constituting the software is installed from a network or a recording medium on a computer installed in dedicated hardware or, for example, a general-purpose personal computer capable of performing various functions by installing various programs.

The recording medium not only includes a removable medium, such as a magnetic disk (including a flexible disc), an optical disc (including a compact disc-read-only memory (CD-ROM) and a digital versatile disc (DVD)), a magnetic optical disc (Mini-Disk (MD) (registered trademark)), or a semiconductor memory, which records the program and is distributed in order to provide the program to a user independent of the apparatus, but also includes the ROM 42 and the hard disk included in the storage unit 46 shown in FIG. 6 which record the program and are built in the apparatus to be provided to the user.

In this specification, steps are not necessarily performed in chronological order in accordance with the written order. The steps may be performed in parallel or independently without being performed in chronological order.

It should be understood by those skilled in the art that various modifications, combinations, sub-combinations and alterations may occur depending on design requirements and other factors insofar as they are within the scope of the appended claims or the equivalents thereof.

What is claimed is:

1. A semiconductor device comprising:
    a tangible non-transitory computer-readable memory configured to store a folder of files, a service being one of the files;
    a processing unit configured to execute a computer program, said computer program instructing said processing unit to execute:
    a step of determining a service access status, a service-no-browse indication being produced when said service access status restricts access to said service by an electronic device;
    a step of determining a folder access status, a folder-no-access indication being produced
    when said folder access status restricts access to said folder by said electronic device:
    a step of producing a non-registration indication when either said service-no-browse indication or said folder-no-access indication has been produced, said non-registration indication falsely indicating an absence of said service from within said folder even when said service exists in said folder,
    wherein said non-registration indication is produced when said service is absent from said memory,
    wherein said folder-no-access indication is producible only when said service access status permits access to said service by said electronic device.

2. The semiconductor device set forth in claim 1, wherein receipt of said non-registration indication by said electronic device prohibits access of said electronic device to said service.

3. The semiconductor device set forth in claim 1, wherein said computer program instructs said processing unit to execute:
    a step of receiving a command from a computer-readable network, said command being sent from said electronic device;
    a step of transmitting said non-registration indication, said non-registration indication being a reply to said command.

4. The semiconductor device set forth in claim 1, further comprising:
    an input unit configured to receive said service access status and said folder access status.

5. The semiconductor device set forth in claim 1, wherein said service access status is stored within said service.

6. The semiconductor device set forth in claim 1, wherein said folder access status is stored within said folder.

7. The semiconductor device set forth in claim 1, wherein said service-no-browse indication is producible only when said service is exists in said memory.

8. The semiconductor device set forth in claim 1, wherein said computer program instructs said processing unit to execute:
   a step of producing a registration indication when neither said service-no-browse indication nor said folder-no-access indication has been produced.

9. The semiconductor device set forth in claim 8, wherein receipt of said registration indication by said electronic device permits access of said electronic device to information within said service.

10. The semiconductor device set forth in claim 1, further comprising:
    a communication unit configured to provide communication with said electronic device.

11. The semiconductor device set forth in claim 10, wherein said communication is wireless communication.

* * * * *